INVENTOR.
JOSEPH S. MUSGRAVE
ROBERT J. RUE
JERRY A. NICHOLSON
Ronald W. Mayes
ATTORNEY

HORIZONTAL DISPLAY NAVIGATIONAL DEVICES

Filed Oct. 10, 1966 5 Sheets-Sheet 2

INVENTOR.
JOSEPH S. MUSGRAVE
ROBERT J. RUE
JERRY A. NICHOLSON

ATTORNEY

Sept. 3, 1968 J. S. MUSGRAVE ET AL 3,400,364

HORIZONTAL DISPLAY NAVIGATIONAL DEVICES

Filed Oct. 10, 1966 5 Sheets-Sheet 3

INVENTOR.
JOSEPH S. MUSGRAVE
ROBERT J. RUE
JERRY A. NICHOLSON

Ronald W. Mayes
ATTORNEY

INVENTOR.
JOSEPH S. MUSGRAVE
ROBERT J. RUE
JERRY A. NICHOLSON
Ronald W. Mayes
ATTORNEY INVENTOR.
JOSEPH S. MUSGRAVE
ROBERT J. RUE
JERRY A. NICHOLSON
Ronald W. Mayes
ATTORNEY 3,400,364
HORIZONTAL DISPLAY NAVIGATIONAL DEVICES

Joseph S. Musgrave, Bellevue, Wash., and Robert J. Rue and Jerry A. Nicholson, Wichita, Kans., assignors to The Boeing Company, Seattle, Wash., a corporation of Delaware

Substituted for abandoned application Ser. No. 292,327, July 2, 1963. This application Oct. 10, 1966, Ser. No. 585,437
10 Claims. (Cl. 340—24)

ABSTRACT OF THE DISCLOSURE

A cathode ray tube provides a horizontal position display of velocities, distances and headings between an airborne aircraft and its destination in response to logic networks and servomechanisms connecting the cathode ray tube to a conventional computer.

This application is a substitute of application Ser. No. 292,327 filed July 2, 1963, now abandoned.

This invention relates to a device that pictorially displays information useful in the navigation of a vehicle.

One of the principal objects of this invention is the provision of a novel electronic navigational aid, suitable for use in fixed wing and rotary wing aircraft, that pictorially displays the position of a destination or target, which may be moving, relative to the aircraft, the aircraft position remaining fixed on the display.

Another object of this invention is the provision of a novel electronic navigational aid, comprising an horizontal situation display on a cathode ray tube, for use in fixed wing and rotary wing aircraft wherein the aircraft's position on the display is indicated by a fixed central fiducial marker and the position of a destination or target-relative thereto is indicated by a position marker movable relative to the aircraft, whereby an inside-out display is provided and a pilot of the aircraft need only note the relative position of the destination or target.

Another object of this invention is the provision of a novel horizontal situation display device, as set forth in the preceding object, that visually displays a ground velocity vector radiating from the fiducial marker, the vector indicating direction of the aircraft relative to the destination or target and indicating ground speed of the aircraft.

Yet another object of this invention is the provision of a novel horizontal situation display device, as set forth in the preceding object, having a rotatable azimuth heading ring surrounding the cathode ray tube in such a manner that the bearing of the ground velocity vector or actual aircraft path, the destination or target bearing from the aircraft, and/or the direction the aircraft is pointed can be readily noted.

Another object of this invention is the provision of a novel horizontal situation display device, as set forth hereinabove, having concentric circles indicated on the cathode ray tube representing distance from the aircraft and magnitude of the ground velocity.

A still further object of this invention is the provision of a novel horizontal situation display device for use in an aircraft, comprising a cathode ray tube adapted to electronically display a destination or target position marker on the face thereof movable relative to a fixed point symbolizing the location of the aircraft, the cathode ray tube having a peripheral ring appearing on the face thereof for indicating, when the position marked is located therein, the bearing of the position marker from the aircraft and not the distance to the position marker from the aircraft.

Yet another object of this invention is the provision of a novel horizontal situation display device, as set forth in the preceding object, having a fixed aircraft longitudinal alignment reference marker.

Another object of this invention is the provision of a novel navigational aid device comprising an horizontal situation indicator electronically displaying a ground velocity vector and/or an air velocity vector for presenting to a pilot in an aircraft a picture of an immediate dynamic navigation situation.

Another object of this invention is the provision of an horizontal situation display navigational aid device presenting, in pictorial form, three heading situations of aircraft longitudinal alignment, rate and direction of aircraft movement relative to an air mass, and rate and direction of aircraft movement relative to the ground.

The invention further resides in certain novel features of construction, combination and arrangements of parts, and further objects and advantages of the invention will be apparent to those skilled in the art to which it pertains from the following description of the present preferred embodiment thereof described with reference to the accompanying drawings, which form a part of this specfication, and wherein the same reference characters represent corresponding parts throughout the several views, and in which.

Figure 2:
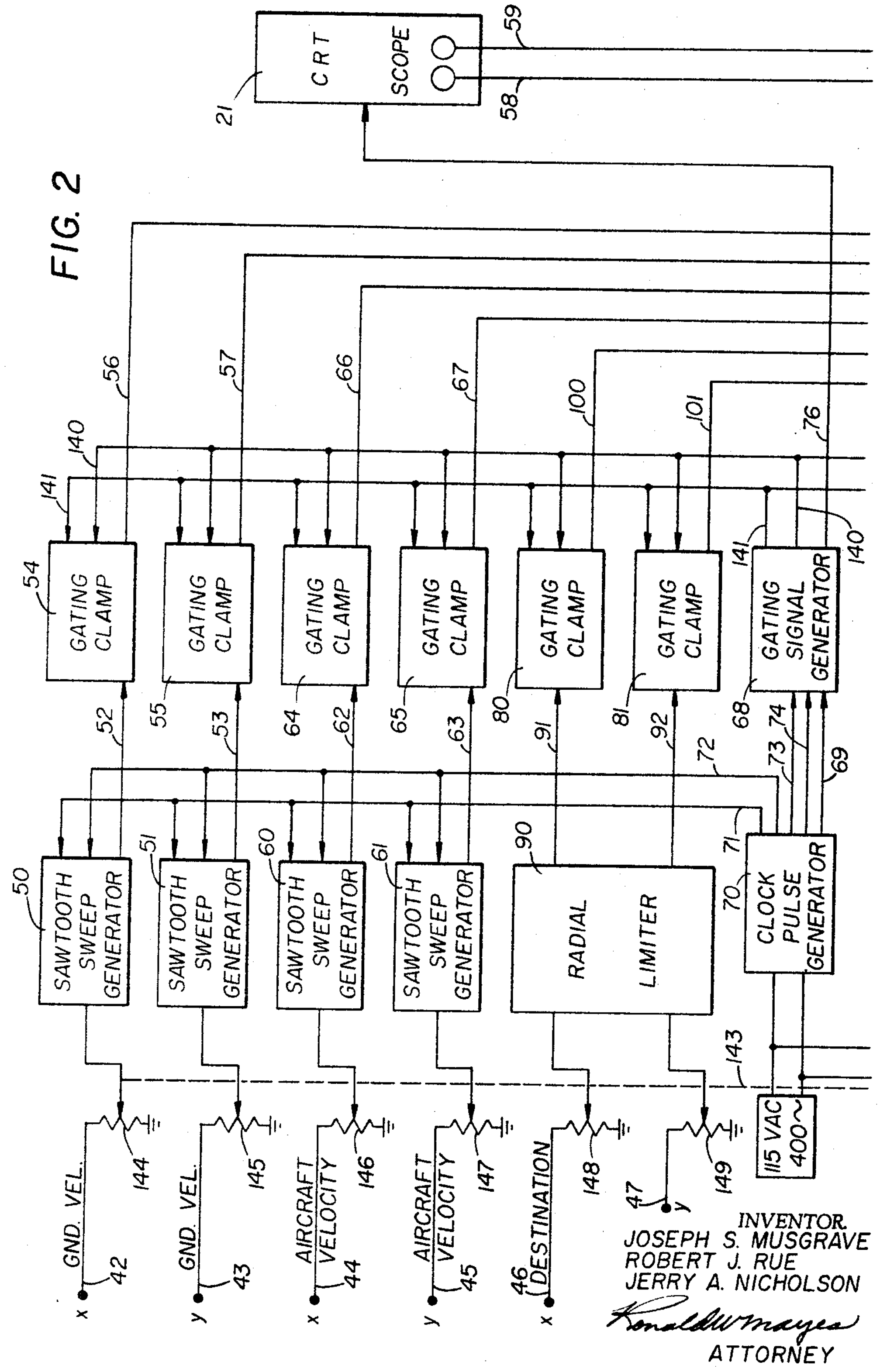
FIG. 2 is a schematic diagram of the electrical circuits for electrically displaying on the cathode ray tube a destination or target position indicator and ground and air velocity vectors of an aircraft.
Figure 3:
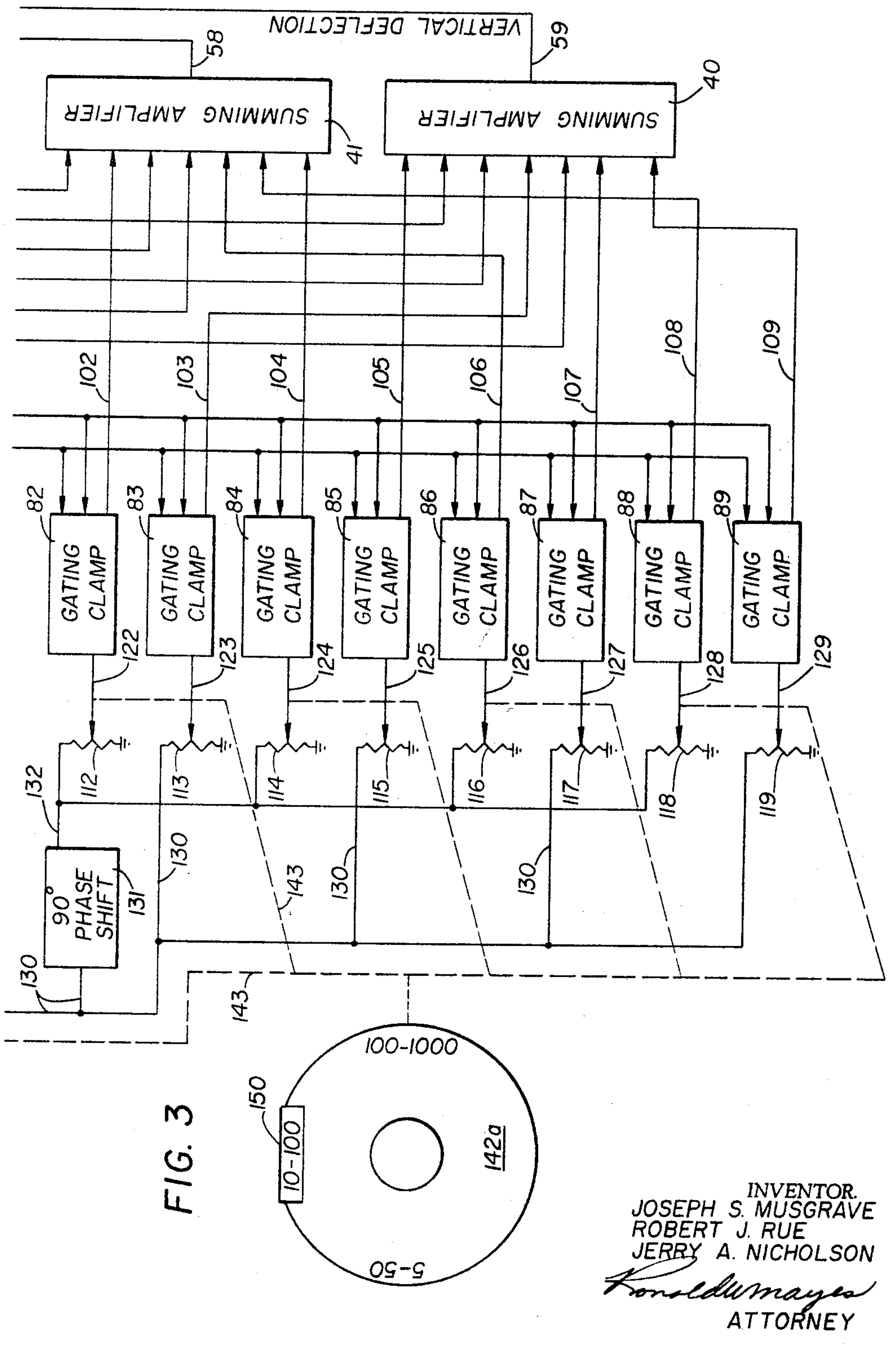
Figure 4:
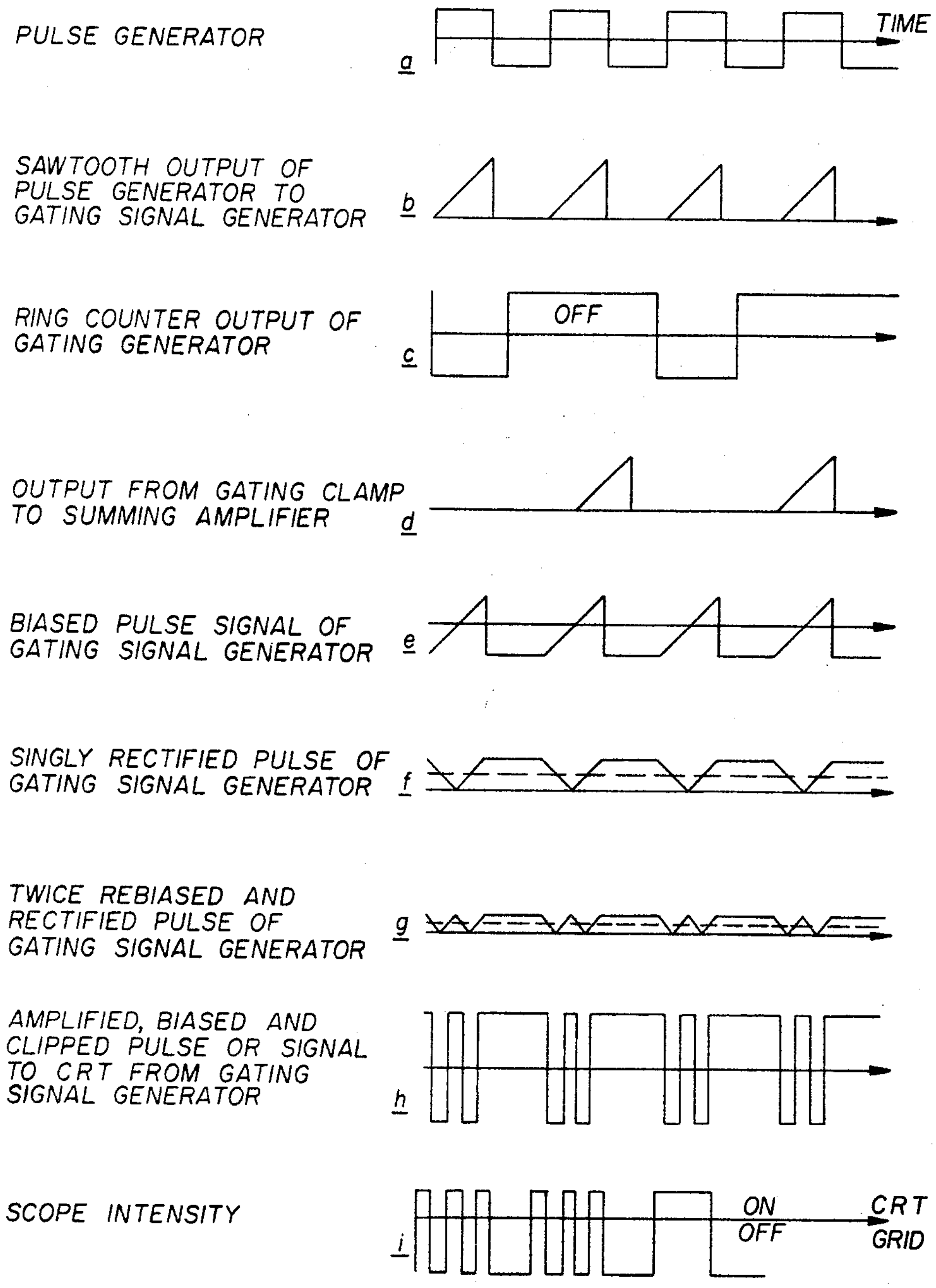
Figure 5:
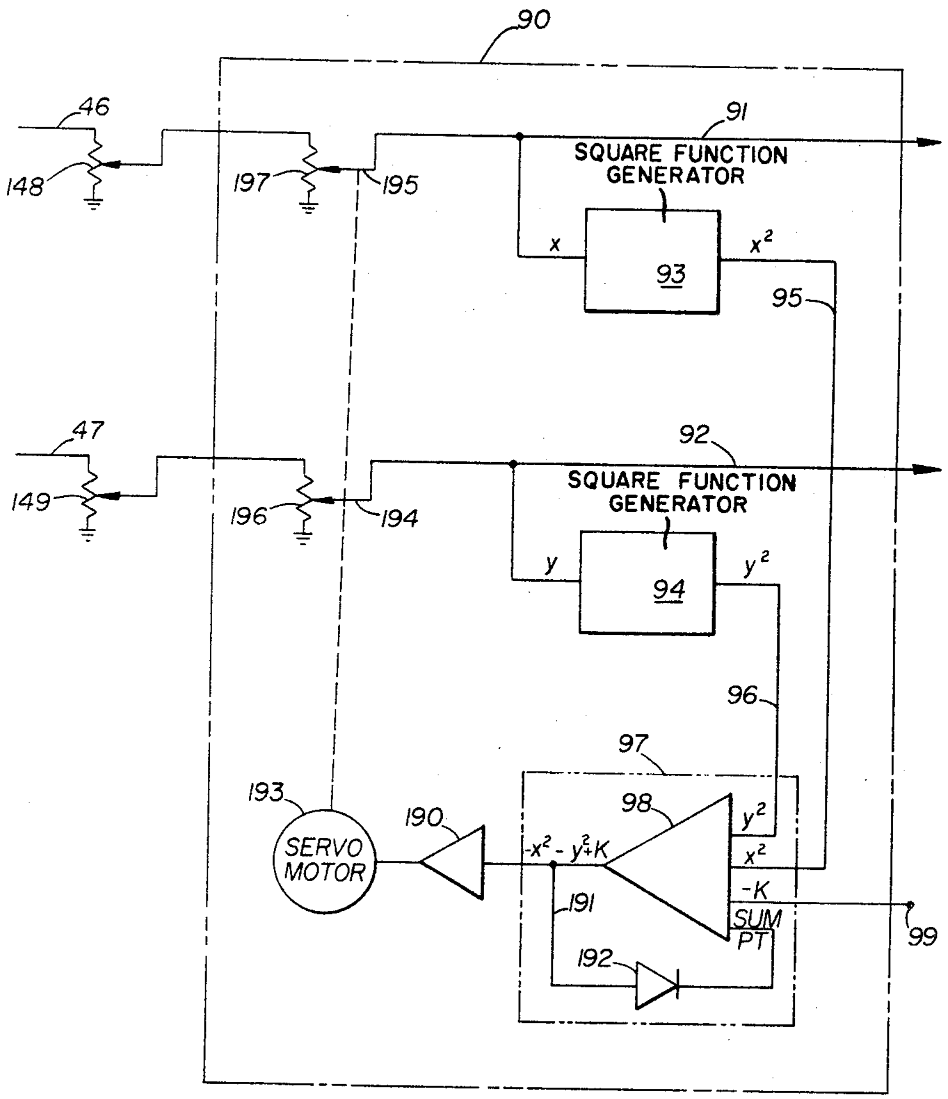

FIG. 3 supplements FIG. 2 and is a schematic diagram of additional electrical circuits for electrically displaying on the cathode ray tube a distance and velocity scale for permitting the visual determination of the distance between the destination or target position indicator and the aircraft, and the air and ground speeds of the aircraft;

FIG. 4 shows signal and blanking relationships on lines *a* through *i* of signals generated in the circuitry of FIGS. 2 and 3; and FIG. 5 is a schematic electromechanical diagram of a radial limiter of FIG. 2.

It is to be understood that the invention is not limited to details of construction and arrangements of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Figure 1:
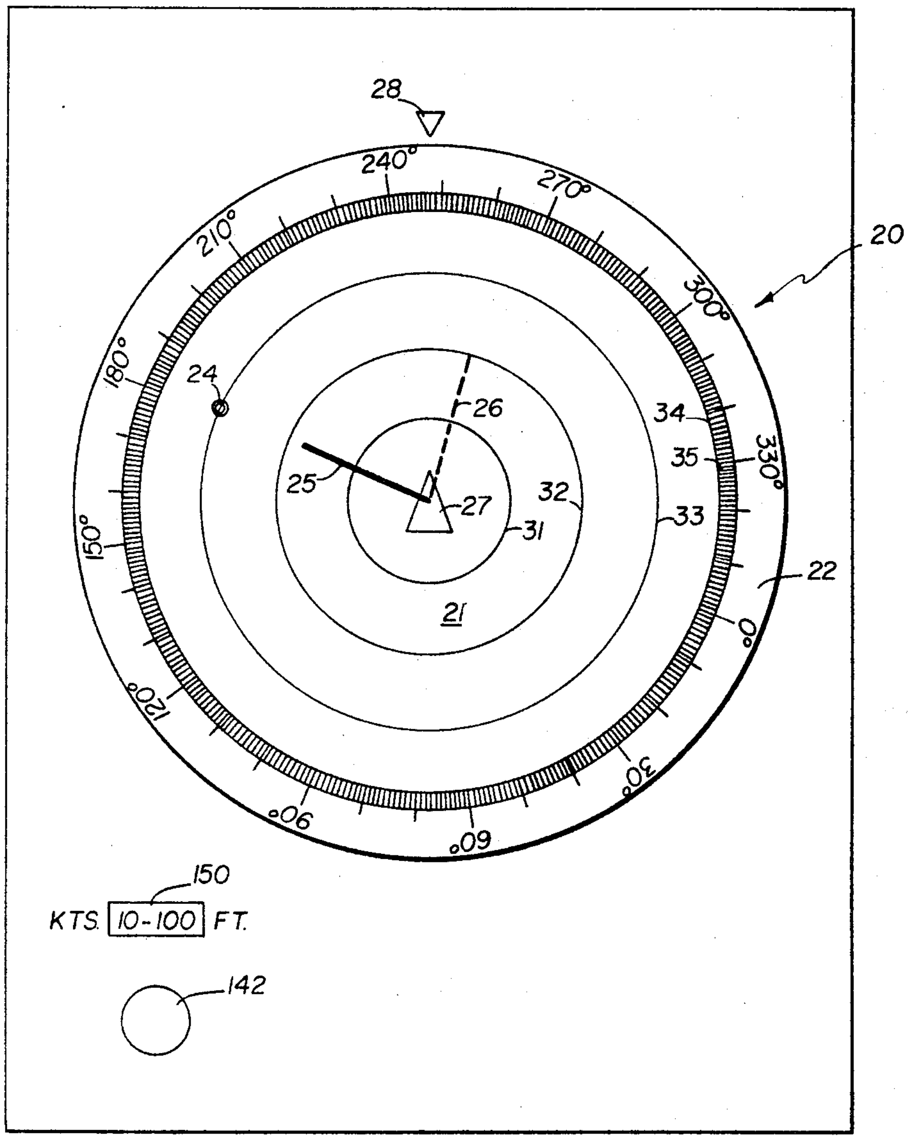
FIG. 1 is a plan view of an inside-out navigational aid device having a cathode ray tube embodying the invention.

Referring to FIGS. 1–3, an horizontal situation display navigational aid device embodying the invention is indicated by the reference numeral 20. The device 20 continuously accepts horizontal situation information from a conventional central computer, not shown, utilizing information derived from all of the necessary sensing, receiving, and automatic integrated director or intercept equipment, and continuously converts the information into a form readily assimilated by a pilot of an aircraft. For the purpose of illustrating the advantageous features of this invention, the aircraft may be of an STOL, short takeoff and landing, or VTOL, vertical takeoff and landing type, such as an helicopter. It is to be understood that this invention is obviously also useful in spacecraft, surface ships, submarines, and even land vehicles.

The horizontal display device 20 comprises a fixed face 21 of a cathode ray oscilloscope tube, CRT, encircled by a rotatable compass rose heading ring 22, FIGS. 1–3, and set flush in an instrument panel or console 23. A destination or target position indicator appears as a pip 24 on the CRT face 21. The pip 24 is preferably made to flicker by adding a low frequency function to the signal sent to the cathode ray tube. The flickering effect of the pip 24 causes it to be easily identified when it coincides on the CRT face 21 with a ground velocity vector, indicated by a solid line 25, and/or an air velocity vector, indicated by a line of dashes 26.

The device 20, being an inside-out display, has a geometric figure, such as an isosceles triangle 27, preferably centrally located and marked on the CRT face 21, for symbolizing the aircraft. A fixed aircraft longitudinal alignment reference marker or index 28 is located on the face of the instrument panel or console 23 for indicating the aircraft heading on the heading ring 22. The compass rose on the heading ring 22 is divided into ten degree increments and numbered in thirty degree increments. The drive means for the heading ring 22 is preferably similar to that disclosed for a heading ring in U.S. Patent No. 3,059,233 to Guarino et al.

In order for a pilot to readily observe the distance from the aircraft 27 to the destination pip 24, four concentric scale rings 31, 32, 33, 34 are preferably electronically projected onto the CRT face 21 in a manner to be described hereinafter with reference to FIG. 3. The rings 31, 32, 33, 34 respectively represent distances of 100, 200, 300, 400 feet from the aircraft when reading the distance to the destination pip 24. However, these same rings 31, 32, 33, 34 also indicate the magnitude or speed of the aircraft ground and air velocity vectors 24, 26. Accordingly, the rings 31, 32, 33, 34 respectively represent aircraft speeds of 10, 20, 30 and 40 knots per hour. There are other scales that can be selected, as seen in FIG. 3, for reducing or magnifying the scale. Suitable larger scales, such as 20, 200, and 1000 miles can also be incorporated into the device. The particular scale selected is suitable to illustrate how the device can be used to touch down an helicopter with only the device 20 and an altimeter as the navigational instruments needed.

One of the advantages of this invention resides in the retention of the pip 24 on the edge of the display to indicate destination bearing when the destination pip 24 is off the scale. For this purpose, a distinctive off-scale bearing ring 35 is indicated on the periphery of the CRT face 21. The ring 35 is etched, but can be electronically projected or otherwise marked on the CRT face 21.

Referring to FIG. 1, a specific navigation situation vector diagram is presented on the display as it actually exists at the moment. A landing spot 24 is 300 feet away at ten o'clock from an helicopter 27 as would be seen out of the left eye of the pilot. The longitudinal axis of the aircraft is aligned on 248 degrees. The air velocity vector 26 of the aircraft is 264 degrees at 20 knots per hour. The aircraft ground velocity vector 25 is 182 degrees at 18 knots per hour. It is assumed that each scale circle represents 10 knots per hour speed and 100 feet distance. The wind vector, not shown, can also be visualized as a line between the outer ends of the two vectors 25, 26 and always pointing to the ground velocity vector 25. The actual bearing of the wind vector can be read by projecting a line through the center of the display to the heading ring 22 parallel to the outer ends of the vectors 25, 26.

In preparing to land, a reduction in airspeed of the aircraft will result in a change in the magnitude of the air velocity vector 26. The change in the air velocity vector 26, combined with the effect of air mass movement, results in a corresponding change in the ground velocity vector 25. By maintaining the ground velocity vector 25 in alignment with the destination or target pip 24 the pilot can translate the aircraft directly to the target without necessarily having to maneuver to a head-on position.

As pointed out, the aircraft is shown in FIG. 1 to be on an 18 knot direct approach to the pip 24 that, at the moment, is 300 feet away on a bearing of 182 degrees. However, wind velocities greater than the 25 knots used in the example can often be encountered. Accordingly, should the air mass movement be great enough to require more tilt of the helicopter than is safe, the pip 24 must be approached head-on with an assist from horizontal engine thrust, if available. In this case, the pip 24 will move down from the top of the display face 21 with the ground velocity vector 25 reaching out toward it and the air velocity vector 26 extending off the display and displaced by whatever drift angle is permitted to exist. An air velocity vector 26 greater in magnitude than the range on the display should be kept in close alignment to the longitudinal axis of the aircraft. The magnitude of the air velocity vector can then be read from a standard air speed indicator, not shown.

As the pip 24 and the outer end of the ground velocity vector 25 come together, the tilt of the aircraft can be adjusted to keep them together as the pip 24 approaches the aircraft symbol 27. An asymptotic approach of the aircraft to zero ground velocity over the target can thus be accomplished and should minimize aircraft fluctuations about the target as well as cause the aircraft to arrive over the target holding the proper air velocity vector to maintain the zero ground velocity vector. At this point the final descent over the target can be made. Prior to or during this descent, the aircraft longitudinal axis can be aligned with the required air velocity vector, should surface winds require such alignment.

The foregoing example illustrates the usefulness of this invention for the precision navigation and landing of a VTOL aircraft, such as an helicopter. However, it is readily apparent that the invention can be used in other aircraft in high velocity flight modes. A change in the distance scale permits the presentation of navigation transmitting stations, intersections, landmarks, and so forth.

A change in the velocity scale and deletion of the air velocity vector permits a pilot to maintain a desired ground track by holding the ground velocity vector on the desired heading. This is accomplished by establishing whatever aircraft heading is necessary to maintain the desired ground track. The difference between these two values is the instantaneous drift in rate and direction. This method permits a form of precise dead reckoning in which the wind variations are immediately canceled out.

A precise ground track can be flown with no wind information available except that it be deduced from the ground velocity vector and the aircraft heading. This deduction is not necessary for flight direction since it is inherently accounted for in the above procedure.

The means for carrying out the invention are schematically shown in block diagram in FIGS. 2 and 3, which show the main signal flow beginning with the direct current, D.C., analog voltage inputs through electronic switching circuits, and into vertical and horizontal deflection summing amplifiers 40, 41 of the cathode ray tube, CRT. The D.C. analog voltage inputs comprise X and Y components in lines 42, 43 of the aircraft ground velocity vector, the X and Y components in lines 44, 45 of the aircraft air velocity vector, and the X and Y components in lines 46, 47 of the destination or target pip coordinates.

*Ground velocity vector*

When a D.C. voltage proportional to the X ground velocity component in the line 42 appears at a sawtooth sweep generator 50, and when a D.C. voltage proportional to the Y ground velocity component in the line 43 appears at a sawtooth sweep generator 51, the X and Y component voltages are each converted to a synchronized sawtooth wave by the sawtooth sweep generators 50, 51, respectively. The sawtooth wave signals in lines 52, 53 have an amplitude proportional to the magnitude of the X and Y component input voltages, but have opposite polarity. See line *b* of FIG. 4. The synchronized sawtooth waves of X and Y components conducted by the lines 52, 53 are simultaneously permitted by gating signal generator clamps 54, 55 in FIG. 2 to appear, via lines 56, 57, at the horizontal and vertical deflection summing amplifiers 41, 40, and via lines 58, 59 to the CRT tube. When these gated synchronized sawtooth waves appear at their respective horizontal and vertical oscilloscope inputs, the spot is caused to sweep at the proper angle and trace a scaled solid ground velocity vector line 25 on the CRT tube face 21, FIG. 1.

*Air velocity vector*

Similarly, the D.C. voltages proportional to the X and Y air velocity components at 44, 45 appear at sawtooth sweep generators 60, 61, respectively. The sawtooth sweep generators 60, 61 convert the X and Y component voltages to synchronized sawtooth waves. An output amplifier of the sawtooth sweep generator 60 provides a sawtooth wave signal in the line 62, line *b* of FIG. 4, having an amplitude proportional to the magnitude of the input voltage and has opposite polarity. The wave form of the output signals of the sawtooth sweep generators 60, 61 is shown in line *b* of FIG. 4. These synchronized sawtooth waves, conducted by lines 62, 63, are simultaneously permitted by gating signal generator clamps 64, 65 in FIG. 2 to appear via lines 66, 67, at the horizontal and vertical deflection summing amplifiers 41, 40, and via lines 58, 59 to the CRT tube. When these gated synchronized sawtooth waves appear at their respective horizontal and vertical oscilloscope inputs, the spot is caused to sweep at the proper angle and trace a scaled and preferably dashed air velocity vector line 26, on the CRT face 21, FIG. 1.

In order ot produce a dash in the aircraft air velocity vector line 26 on the CRT face 21, a secondary blanking signal is produced in a gating signal generator 68 in FIG. 2. This is accompilshed by biasing a sawtooth input in line 69 from a clock pulse generator 70, FIG. 2, equally about zero and then full wave rectifying the signal twice in the gating signal generator 68. This is shown taking place in wave lines *e, f, g, h, i*, of FIG. 4, which illustrates the various wave signal and blanking relationships. When this signal is sent to a high gain operational amplifier that acts as a crossing detector in the gating signal generator 68, a pulse train, line *h* of FIG. 4, is produced which is superimposed on the primary blanking signal, line *a* of FIG. 4. The composite blanking signal is a combination of lines *h* and *a* of FIG. 4, and gives the wave form of line *i* of FIG. 4.

This composite blanking signal, line *i*, will also blank the target or destination pip 24 for a portion of its display period. This is desirable in order to decrease its average intensity. When the ground velocity vector 25 is to appear, the secondary blanking is clamped off by the same gating signal from a ring counter of the gating signal generator 68 as seen in line *c* of FIG. 4, which operates the ground velocity vector gating clamps 54, 55. The intensity of the oscilloscope trace in the cathode ray tube is modulated in order to eliminate retracting and the appearance of switching transients at the CRT face 21.

*Clock pulse generator*

The primary function of the clock pulse generator 70, FIG. 2, which is preferably supplied with a 115 v. A.C. reference signal having a frequency of 400 cycles per second, is to allow the passage of the proper pair of X and Y component signals of either one of the speed-scale rings 31, 32, 33, 34, the destination pip 24 position, the groun dvelocity vector 25, or the air velocity vector 26, and to eliminate all of the other signals. More particularly, the clock pulse generator 70 simultaneously feeds clamping pulse signals, of a square wave form shown in line *a* of FIG. 4, via lines 71 and 72 to the sawtooth sweep generators 50, 51, 60, 61. However the clamping signals in the line 72 are inserted or phased so as to oppose and blank the signal in the line 42 prior to reaching the line 52.

The D.C. signals of the resolved velocity vector components, such as the X ground velocity component 42 in FIG. 2, are integrated by the sawtooth sweep generator 50. The linearity of this integration is assured preferably by a positive feedback in the sawtooth sweep generator 50, not shown.

This integration is reset by clamping signals in the lines 71, 72 from the clock pulse generator 70 which clamp the integrator output to zero at a 400 cycle per second rate.

Moreover, the clock pulse generator 70 supplies a primary blanking signal via line 73, a voltage input via line 74 to a ring counter, and a sawtooth output via the line 69 to the gating signal generator 68.

The clock pulses for the sweep generators 50, 51, 60, 61 are produced by feeding the 400 cycle reference signal to a first high gain amplifier in the generator 70. The resulting square wave can be increased in negative pulse width in a conventional manner, such as by adjusting a wiper in a negative direction on a center tapped potentiometer that controls the input to the first amplifier. A second amplifier, an operational amplifier, inverts this signal. Preferably diodes, forming a bridge, are so arranged in the sawtooth sweep generator 50, for example, that when the output of the first operational amplifier is negative and the output of the second operational amplifier is positive, clamping will occur in the sawtooth sweep generator 50. At the same time that the sawtooth sweep generator 50 is being clamped, a similar wave is produced by a third amplifier in the clock pulse generator 70 in preparation for blanking the unwanted portion of the sweep at the CRT by reducing the intensity of the trace, via line 73, the gating signal generator 68, and a line 76. This signal is generated separately within the clock pulse generator 70 for the purpose of allowing for separate adjustment of the pulse width. The sawtooth sweep generator 51 operates in a manner similar to and with the sawtooth sweep generator 50. Similarly, the sawtooth sweep generators 60, 61 operate together in the same manner.

*Gating signal generator*

This primary blanking pulse train is sent via lines 69, 73, 74 to the gating signal generator 68 where it changes, in sequence, the states of a plurality of binary stages of the ring counter thereof. Each stage is connected to a gating clamp 54, 55, 64, 65, 80, 81, 82, 83, 84, 85, 86, 87, 88, 89, FIGS. 2 and 3. When a stage is in the "off state," it supplies a symmetrical pair of clamping voltages to a gating clamp, such as, for example, the gating clamp 54, so that the input to the clamp 54 from the sawtooth sweep generator 50 is stopped from reaching the horizontal deflection summing amplifier 41. Similarly, the gating signal generator 68 supplies symmetrical pairs of clamping voltage signals simultaneously to pairs of gating clamps 54 and 55, 64 and 65, 80 and 81, 82 and 83, 84 and 85, 86 and 87, and 88 and 89 so that the inputs thereto from the sweep pairs of sawtooth sweep generators 50 and 51, 60 and 61, a radial limiter 90 having destination pip analog voltage outputs in lines 91, 92 from input lines 46, 47, and the four speed-distance ring scale inputs to the pairs of gating clamps 82 and 83, 84 and 85, 86 and 87, and 88 and 89, with the exception that each pair of these gating clamps is turned on in its turn for a small part of a second. In this manner, the outputs to each summing amplifier 40, 41 are limited to one analog voltage signal at a time. Accordingly, the amplifiers 41, 40 respectively receive, at the same time, analog signals of the X and Y components of the ground velocity vector from the gating clamps 54, 55 via lines 56, 57. All of the other gating clamps are clamped. The amplifiers 41, 40 next receive, at the same time, analog voltage signals from the gating clamps 64, 65 via lines 66, 67 while all of the other gating clamps are clamped, and so forth.

*Destination pip*

The location of the destination pip 24 on the CRT face 21 is controlled by the signal supplied to the cathode ray tube CRT by the vertical deflection and horizontal deflection summing amplifiers 40, 41, as respectively controlled by the gating clamps 81, 80. Inasmuch as the pip 24 merely appears as a dot and not as a straight line or a circle, no sweep generators or ninety degree phase shift circuits are needed as in the case of the velocity vectors 25, 26 and the speed-range circles 31, 32, 33, 34, respectively. The analog voltage signals representative of the X and Y destination components are presented in lines 46 and 47 and are respectively fed to the gating clamps 80 and 81, via lines 91 and 92. However, a radial limiter 90 is needed to keep the pip 24 from going off the CRT face 21 so that the bearing of the destination can always be read even though the pip 24 is off the range scale.

By referring to FIG. 1, it is apparent that the distance from the aircraft 23 to the pip 24 on the edge of the CRT face 21 is an hypotenuse where the X and Y components form the two legs of a right triangle. The sum of the values of the squared X and Y component voltage signals is equal to a constant voltage signal K, and may be expressed as follows: $X^2+Y^2=K$; also $X^2+Y^2-K=0$. Accordingly, this constant voltage signal cannot be exceeded if the pip 24 is to stay on the CRT face 21. The radial limiter 90 prevents the squares of the X and Y component voltage signals from exceeding K in the following manner. Voltage signals representative of the X and Y component signals are respectively picked off from lines 91, 92 and squared by square function generators 93, 94, FIG. 5. The squared values of X and Y are fed via lines 95 and 96 to a comparator 97 having a summing amplifier 98. A limiting reference value of −K is also fed to the amplifier 98 via a line 99. Only plus values of output signals exceeding the value of K will drive a servo-amplifier 190 because all positive signal outputs will be fed back into the input side of the summing amplifier 98 via a feedback circuit 191 having diode 192 in opposition to the −K signal for nulling the −K signal input. An analog voltage signal equivalent to the amount by which $X^2+Y^2$ exceeds the predetermined K value causes the servo-amplifier 190 to drive a servo-motor 193 which proportionately adjusts wipers 194, 195 on grounded potentiometers 196, 197 connected in lines 91, 92, respectively, so that the pip 24 remains on the CRT face 21.

The gating clamps 80, 82, 84, 86, and 88 feed signals to the horizontal deflection summing amplifier 41 via lines 100, 102, 104, 106, and 108, respectively. The gating clamps 81, 83, 85, 87, and 89 feed signals in sequence to the vertical deflection summing amplifier 40 via lines 101, 103, 105, 107 and 109, respectively. The gating clamps 82, 83, 84, 85, 86, 87, 88, and 89 are supplied an analog voltage signal picked off from potentiometers 112, 113, 114, 115, 116, 117, 118, and 119, respectively via lines 122, 123, 124, 126, 127, 128 and 129. All of the potentiometers 112, 113, 114, 115, 116, 117, 118 and 119 are grounded and each receives a signal from the 115 v. A.C., 400 cycles per second power source via a main line 130. However, signal phase shift means 131 provides a phase shift of ninety degrees in a signal in the line 130 being transmitted to the potentiometers 112, 114, 116, and 118 via line 132 so that the range-speed circles 31, 32, 33, 34 can be respectively made to appear on the CRT face 21.

For purposes of simplicity, the opposed and oppositely phased blanking signals from the gating signal generator 68 to the gating clamps 54, 55, 64, 65, 80, 81, 82, 83, 84, 85, 86, 87, 88, and 89 are shown in FIG. 1 to flow via only two lines 140, 141. However, it is to be understood that the gating signal generator 68 has outputs separately connected to each pair of gating clamps, the pairs being the clamps 54 and 55, 64 and 65, 80 and 81, 82 and 83, 84 and 85, 86 and 87, and 88 and 89.

*Range-speed scale selector*

In order to change the scale of the navigation display on the CRT face 21, a range-scale control knob 142 is preferably provided so as to change, via a mechanical linkage 143, the settings of the wipers on range-speed potentiometers 112, 113, 114, 115, 116, 117, 118, 119, 144, 145, 146, 147, 148, 149. The range-speed potentiometers 144, 145, 146, 147, 148, 149 are respectively connected into lines 42 and 43 of the X and Y ground velocity component inputs, lines 44 and 45 of the X and Y air velocity component inputs, and lines 46 and 47 of the X and Y destination pip component inputs.

It has been pointed out that the scales of the speed-range rings 31, 32, 33 and 34 respectively represent speeds of 10, 20, 30, 40 knots and distances of 100, 200, 300, 400 feet in the aforementioned example when used with a rotary wing or vertical takeoff and landing type aircraft. The selector knob 142 may be used to select any of a number of speed-range rings representing speeds of 5, 10, 15, 20 knots and distances of 50, 100, 150 and 200 feet; speeds of 100, 200, 300, 400 knots and 100, 200, 300, 400 miles or 1000, 2000, 3000, 4000 feet, etc. The mechanization of the linkage 143 for operating the wipers of the potentiometers is well within the capabilities of one skilled in the art. It is necessary that the rings 31, 32, 33, 34, the vectors 25, 26 and the pip 24 all have their scales changed simultaneously. This is accomplished by linearly changing the various analog voltage inputs. Referring to FIG. 1, as the speed-range scale knob 142 is turned, the speed and range of the scale selected is preferably viewed on a disk 142*a* through a window 150.

It will be understood that this invention can be modified to adapt it to various circumstances and conditions, and it is accordingly desired to comprehend within the purview of this invention such modifications as may be considered to fall within the scope of the appended claims.

What is claimed, is:

1. In an horizontal display device suitable for use as a navigational aid in a piloted craft, cathode ray tube means having a face defining a circular display area having a fixed center representing the relative position of the piloted craft, destination position indicator means for electrically indicating the position of a destination pip on the face of said tube means, aircraft ground velocity vector means electrically displayed as a line at the center of the face of said tube means and radiating from the center of the face of said tube means, aircraft air velocity vector means electrically displayed as a broken line at the center of the face of said tube means and radiating from the center of the face of said tube means, concentric scale ring means electrically displayed on the face of said tube means for enabling the easy reading of the distance of said destination pip from the center of the face of said tube means and for the easy reading of the magnitude of said aircraft ground velocity vector means and said aircraft air velocity vector means, rotatable heading ring means encircling the face of said tube means for permitting the easy reading of the bearing of said ground and air velocity vector means and of said destination pip from the center of the face of said tube means, reference marker means defining an aircraft longitudinal alignment reference marker disposed adjacent said heading ring means for indicating the longitudinal alignment of the aircraft on said heading ring means, bearing marker means marked on the periphery of the face of said tube means for defining an area indicating bearing only of said velocity vector means and said destination pip, and means for changing the scale of said scale ring means and of said velocity vector means and said destination position indicator means.

2. In an horizontal display device suitable for use as a navigational aid in a piloted craft, cathode ray tube means having a face defining a circular display area having a fixed center representing the relative position of the piloted craft, fiducial marker means symbolizing an aircraft marked at the center of the face of said tube means, aircraft ground velocity vector means electrically displayed at the center of the face of said tube means and radiating from the center of the face of said tube means, concentric scale ring means electrically displayed on the face of said tube means for enabling the easy reading of the distance of said destination position indicator means from the center of the face of said tube means and for the easy reading of the magnitude of said aircraft ground velocity vector means, and rotatable heading ring means encircling the face of said tube means for permitting the easy reading of the bearing of said ground velocity vector means.

3. In an horizontal display device suitable for use as a navigational aid in a piloted craft, cathode ray tube means having a face defining a circular display area having a fixed center representing the relative position of the piloted craft, fiducial marker means symbolizing an aircraft marked at the center of the face of said tube means, aircraft air velocity vector means electrically displayed at the center of the face of said tube means and radiating from the center of the face of said tube means, concentric scale ring means electrically displayed on the face of said tube means for enabling the easy reading of the magnitude of said aircraft air velocity vector means, and rotatable heading ring means encircling the face of said tube means for permitting the easy reading of the bearing of said air velocity vector means.

4. In an horizontal display device suitable for use as a navigational aid in a piloted craft, cathode ray tube means having a face defining a circular display area having a fixed center representing the relative position of the piloted craft, destination position indicator means for electrically indicating the position of a destination on the face of said tube means, aircraft ground velocity vector means electrically displayed at the center of the face of said tube means radiating from the center of the face of said tube means, and rotatable heading ring means encircling the face of said tube means for permitting the easy reading of the bearing of said ground velocity vector means and of said destination position indicator means from the center of the face of said tube means.

5. In an horizontal display device suitable for use as a navigational aid in a piloted craft, cathode ray tube means having a face defining a circular display area having a fixed center representing the relative position of the piloted craft, destination position indicator means for electrically indicating the position of a destination pip on the face of said tube means, aircraft air velocity vector means electrically displayed at the center of the face of said tube means and radiating from the center of the face of said tube means, and rotatable heading ring means encircling the face of said tube means for permitting the easy reading of the bearing of said air velocity vector means and of said destination pip from the center of the face of said tube means.

6. In an horizontal display device suitable for use as a navigational aid in a piloted craft, cathode ray tube means having a face defining a circular display area having a fixed center representing the relative position of the piloted craft, aircraft ground velocity vector means electrically displayed as a line at the center of the face of said tube means and radiating from the center of the face of said tube means, aircraft air velocity vector means electrically displayed as a broken line at the center of the face of said tube means and radiating from the center of the face of said tube means, and rotatable heading ring means encircling the face of said tube means for permitting the easy reading of the bearing of said ground and air velocity vector means.

7. In an horizontal display device suitable for use as a navigational aid in a piloted craft, cathode ray tube means having a face defining a circular display area having a fixed center representing the relative position of the piloted craft, destination position indicator means for electrically indicating the position of a destination pip on the face of said tube means, aircraft ground velocity vector means electrically displayed as a line at the center of the face of said tube means and radiating from the center of the face of said tube means, aircraft air velocity vector means electrically displayed as a broken line at the center of the face of said tube means and radiating from the center of the face of said tube means, and rotatable heading ring means encircling the face of said tube means for permitting the easy reading of the bearing of said ground and air velocity vector means and of said destination pip.

8. In an horizontal display device suitable for use as a navigational aid in a piloted craft, cathode ray tube means having a face defining a circular display area having a fixed center representing the relative position of the piloted craft, destination position indicator means for electrically indicating the position of a destination pip on the face of said tube means, aircraft ground velocity vector means electrically displayed as a line at the center of the face of said tube means and radiating from the center of the face of said tube means, aircraft air velocity vector means electrically displayed as a broken line at the center of the face of said tube means and radiating from the center of the face of said tube means, reference marker means defining an aircraft longitudinal alignment reference marker disposed adjacent said tube means for indicating the longitudinal alignment of the aircraft, and bearing marker means marked on the periphery of the face of said tube means for defining an area indicating bearing only of said velocity vector means and said destination pip.

9. In an horizontal display device suitable for use as a navigational aid in a piloted craft, cathode ray tube means having a face defining a circular display area having a fixed center representing the relative position of the piloted craft, destination position indicator means for electrically indicating the position of a destination pip on the face of said tube means, and aircraft ground velocity vector means electrically displayed as a line at the center of the face of said tube means and radiating from the center of the face of said tube means.

10. In an horizontal display device suitable for use as a navigational aid in a piloted craft, cathode ray tube means having a face defining a circular display area, destination position indicator means for electrically indicating the position of a destination pip on the face of said tube means, aircraft ground velocity vector means electrically displayed as a line on the face of said tube means, and aircraft air velocity vector means electrically displayed as a broken line on the face of said tube means.

References Cited

UNITED STATES PATENTS

| | | | |
|---|---|---|---|
| 2,588,916 | 3/1952 | Field et al. | 178—7.83 |
| 2,823,378 | 2/1958 | Reedy et al. | 340—25 |
| 2,991,445 | 7/1961 | Haynes et al. | 178—7.83 |

JOHN W. CALDWELL, *Primary Examiner.*

ALVIN H. WARING, *Assistant Examiner.*